(12) United States Patent
Ho

(10) Patent No.: US 10,711,987 B1
(45) Date of Patent: Jul. 14, 2020

(54) INDICATION SYSTEM

(71) Applicant: Morr Global Co., Ltd., Taipei (TW)

(72) Inventor: Hung-hsin Ho, Taipei (TW)

(73) Assignee: Morr Global Co., Ltd., Taipei (TW)

( * ) Notice: Subject to any disclaimer, the term of this patent is extended or adjusted under 35 U.S.C. 154(b) by 0 days.

(21) Appl. No.: 16/590,399

(22) Filed: Oct. 2, 2019

(51) Int. Cl.
| | | |
|---|---|---|
| *F21V 23/04* | (2006.01) | |
| *B60Q 1/26* | (2006.01) | |
| *B60Q 1/38* | (2006.01) | |
| *B60Q 1/44* | (2006.01) | |
| *F21V 23/00* | (2015.01) | |
| *F21W 103/20* | (2018.01) | |
| *F21W 107/13* | (2018.01) | |
| *F21W 103/35* | (2018.01) | |
| *F21V 33/00* | (2006.01) | |

(52) U.S. Cl.
CPC ........ *F21V 23/0485* (2013.01); *B60Q 1/2676* (2013.01); *B60Q 1/38* (2013.01); *B60Q 1/44* (2013.01); *F21V 23/003* (2013.01); *F21V 23/0435* (2013.01); *F21V 33/0008* (2013.01); *F21W 2103/20* (2018.01); *F21W 2103/35* (2018.01); *F21W 2107/13* (2018.01)

(58) Field of Classification Search
CPC .............. F21V 23/0485; F21V 23/003; F21V 23/0435; F21V 33/0008; F21W 2103/20; F21W 2107/13; F21W 2103/35; A42B 3/0453; A42B 3/066; B60Q 1/2676; B60Q 1/2673; B60Q 1/44; B60Q 1/38; B60Q 1/0023; B60Q 1/444; B60Q 1/2661; B60Q 1/447; B62J 6/00; B62J 27/00; G08B 21/0438
See application file for complete search history.

(56) References Cited

U.S. PATENT DOCUMENTS

| | | | | |
|---|---|---|---|---|
| 6,538,567 | B2 * | 3/2003 | Stewart | A41D 13/01 340/475 |
| 6,933,836 | B2 * | 8/2005 | Hsu | B60Q 1/2676 340/432 |
| 7,221,263 | B2 * | 5/2007 | Moore | A42B 3/0453 340/427 |
| 7,455,139 | B2 * | 11/2008 | Lee | B60Q 1/2673 180/167 |
| 8,269,619 | B2 * | 9/2012 | Lee | A42B 3/0453 340/432 |
| 9,096,174 | B1 * | 8/2015 | Banks | B60Q 1/34 |

(Continued)

*Primary Examiner* — Vibol Tan

(57) ABSTRACT

The indication system of the present invention includes an indication device and an activation device. The activation device includes a cover and an activator movable with the cover relatively. Wherein a first sensor is assembled inside the cover to generate a first signal by sensing a horizontal displacement of the activator, a second sensor is assembled inside the cover to generate a second signal by sensing a vertical displacement of the activator, and then a transmission unit transmits the first signal and the second signal to the indication device; the activator is constructed with a combination portion and a control portion separately on two opposite sides. When the control portion is driven by a user to move horizontally or vertically, the combination portion can drive an operation member to be displaced synchronously. The indicator light of the bike is activated synchronously in conjunction with the indication system of present invention.

12 Claims, 20 Drawing Sheets

(56) References Cited

U.S. PATENT DOCUMENTS

| | | | | |
|---|---|---|---|---|
| 9,340,246 B2* | 5/2016 | Woram | ................... | B62J 6/001 |
| 9,457,709 B2* | 10/2016 | Alataas | ................ | B60Q 1/2676 |
| 10,037,670 B2* | 7/2018 | Lin | ......................... | G08B 7/06 |
| 10,086,894 B2* | 10/2018 | Arkhangelskiy | ......... | B62J 6/005 |
| 10,315,559 B2* | 6/2019 | Hammock | ................. | B62J 6/04 |
| 2009/0158508 A1* | 6/2009 | Quaranta | ............. | A42B 3/0453 |
| | | | | 2/421 |
| 2016/0068214 A1* | 3/2016 | Tang | ........................ | B62J 6/00 |
| | | | | 362/108 |

* cited by examiner

INDICATION SYSTEM

BACKGROUND

Field of Invention

The present invention relates to an indication system capable of controlling display state of light, and more particularly to an indication system capable of synchronously controlling display states in conjunction with bike controller.

Description of Related Art

Traffic accidents are mostly caused by carelessness or bad driving habits of drivers or bikers, or caused by blind spots of drivers or bikers while driving. In addition, the condition of poor visibility resulted from weather factors is also one of the reasons for traffic accidents. In order to decrease the traffic accident rate, one way is to improve the driver's bad driving habits himself. Moreover, disposing additional warning or indication system on the bike or the biker can also reduce the traffic accident rate.

With the rise of the awareness of exercise, riding the bicycle has also been one of the common health activities for people. General exercisers mostly install headlights and rear warning lights on the bicycles. However, when turning or braking the bicycle, the exerciser usually has to turn his head back or wave to alert the rear person, which often distracts the exerciser such that the traffic accident rate is still high.

Therefore, the helmet, raincoat or backpack are provided with additional wireless-controlled warning lights or turn lights on the market currently, so that the biker or exerciser can alert the rear drivers while turning or braking.

Reference is made to FIG. 14. The conventional signal light control device 9 of the helmet includes a controller 90 and a signal light driver 91. The controller 90 is disposed adjacent to the bike handle, and has a control circuit (not shown), a signal light switch 92 and a battery (not shown). By changing the trigger state of the signal light switch 92, the control circuit transmits the signal light control signal corresponding to the changed trigger state. The signal light driver 91 is disposed on the helmet, and has a driving circuit 93, a light set 94 and a battery 95. The driving circuit 93 receives the signal light control signal from the controller 90 to drive a left-turning light, a right-turning light, a warning light of the light set 94 correspondingly.

However, such a controller of the signal light control device is independent of the light controller of the bike itself. When the biker turns the bike, he must operate the light controller of the bike and the signal light control device of the helmet separately so that two different light sets can work separately. For the biker, it is undesired to make the operation twice for presenting the same information of turning left or turning right, and afterwards to operate these two controllers separately to turn off the respective light sets, thereby increasing the inconvenience in operation. In view of this deficiency, it is necessary for the conventional light control systems to be improved.

SUMMARY

A primary object of the present invention is to provide an indication system, it allows the activation device of the indication system to combine with the indicator light controller of the bike, so that the indicator light (e.g., the turn light and the brake light) of the bike is capable of being activated synchronously in conjunction with the indication device of the indication system, thereby increasing the safety of riding the bike.

A secondary object of the present invention is that the indication system can be installed to the bike controller to be displayed synchronously in conjunction with other lamps; besides, it can change to an independent display device to be used according to user needs.

Another object of the present invention is that the rotatable connection mechanism of the indication device includes a turning mechanism, so that the activation device can swing to combine with the bike controller, which allows the indication system to be adapted in various bike controller with different brands, thereby increasing the convenience of operation for the user.

A further object of the present invention is that the rotatable connection mechanism is designed with a quick-release structure. It allows the user to quickly install, disassemble and store the rotatable connection mechanism. Moreover, it allows the single activation mechanism selectively to combine with the rotatable connection mechanism which is mounted on different positions according to different usage states, thereby greatly increasing the convenience of using the indication system.

In order to achieve the aforementioned objects, the indication system of the present invention includes an indication device and an activation device. The indication device includes at least one display unit and a wireless controller for controlling the at least one display unit. The activation device includes a cover and an activator movably mounted to the cover. The cover is provided with a first sensor, a second sensor and a transmission unit, wherein the first sensor can sense a horizontal displacement of the activator to generate a first signal, the second sensor can sense a vertical displacement of the activator to generate a second signal, and the transmission unit is electrically connected to the first sensor and the second sensor and is configured for transmitting the first signal and the second signal to the wireless controller. The activator is constructed with a combination portion and a control portion separately on the opposite sides. The combination portion is assembly connected to and cooperates with an operation member of an indicator light of a bike, such that the combination portion drives the operation member to be displaced synchronously when the control portion is driven by a user to move horizontally or vertically.

Wherein the activator includes a lateral sliding member and a pressing member. The lateral sliding member is movably mounted to a slide rail inside the cover to move horizontally, and the pressing member is movably mounted to the lateral sliding member to move vertically.

The lateral sliding member is provided with a casing body which forms a combination space, and a top portion and a side surface of the casing body are provided with a perforation and a slot, respectively. The pressing member is provided with a substrate located within the combination space. One side of the substrate is provided with a pressing plate projecting and extending outwardly through the slot. The top portion of the substrate is provided with a protruding block extending upwardly through the perforation, and the combination portion drives the operation member to be displaced by a bottom surface of the substrate and an inner side wall surface of the casing body.

The first sensor includes a plurality of lateral tact switches. The lateral tact switches are disposed to two opposite sides outside of the casing body, respectively. The second sensor includes a longitudinal tact switch, and the longitudinal tact switch is disposed below and covered by the pressing plate.

The cover includes a first case and a second case assembly connected to the first case. The first case is formed with a first opening for the control portion of the activator to project therethrough and be exposed, the second case is formed with a second opening, and the position of the second opening is corresponding to the position of the combination portion.

In a preferred embodiment, the indication system further includes a rotatable connection mechanism, and the rotatable connection mechanism includes a connection member and a positioning member. One end of the connection member is constructed with a connection portion fixed to the cover, and another opposite end of the connection member is constructed with a first assembling portion. The positioning member is provided with a second assembling portion detachably connected to the first assembling portion, and the second assembling portion is connected to a positioning portion which forms a positioning space.

The connection member further includes a turning portion located between the connection portion and the first assembling portion, and the turning portion includes a first pivot joint and a second pivot joint for swinging relatively with the first pivot joint.

The connection member is further provided with an compressing unit configured for acting on the first pivot joint and the second pivot joint, so as to switch the first pivot joint and the second pivot joint in an active state or a fixed state selectively, wherein the active state is that the first pivot joint is relatively swingable with the second pivot joint, and the fixed state is that the first pivot joint is unable to move relatively to the second pivot joint.

The positioning portion is provided with two gripping arms which form a positioning space collectively, and when the gripping arms are displaced or deformed, the size of the positioning space is changed. In one possible embodiment, a gap communicated with the positioning space is formed between the gripping arms, and a latch member is disposed through the gripping arms in the position of gap, such that the gripping arms are deformed by a force to change the size of the positioning space.

The first assembling portion is provided with a stub, and each of two opposite sides of the stub is provided with a guiding rod. A second assembling portion is provided with a recess for accommodating the stub, the recess is provided with a guiding rail disposed on each of two opposite side wall surfaces of the recess, and the guiding rail includes a first path and a second path turned from the first path.

In order to allow the indication system of the present invention to directly apply in the bicycle without additional controller, the activation device further includes a covering body disposed on and fastened to the second opening, and the covering body includes a resilient member contacting against the combination portion of the activator.

The feature of the present invention is that the activation device of the indication system can cooperate with the operation member mounted to the indicator light of the bike, such that the combination portion of the indicator can move synchronously in conjunction with the operation member of the indicator light of the bike. It allows the biker to perform the push/trigger operation once only, and the indicator light of the bike and the indication device of the indication system can be turned on or turned off simultaneously, thereby improving the conventional inconvenience of that different devices must be operated several times.

Furthermore, the activation device can be combined with the covering body additionally, so that the activation device becomes an independently-usable device, thereby allowing the bicycles without lamps or pedestrians to use the indication system of the present invention directly, which greatly improves the application range of the indication system.

DETAILED DESCRIPTION

In order to facilitate further understanding the structure, use and characteristics of the present invention, reference will now be made in detail to the preferred embodiments, examples of which are illustrated in the accompanying drawings.

Figure 1:
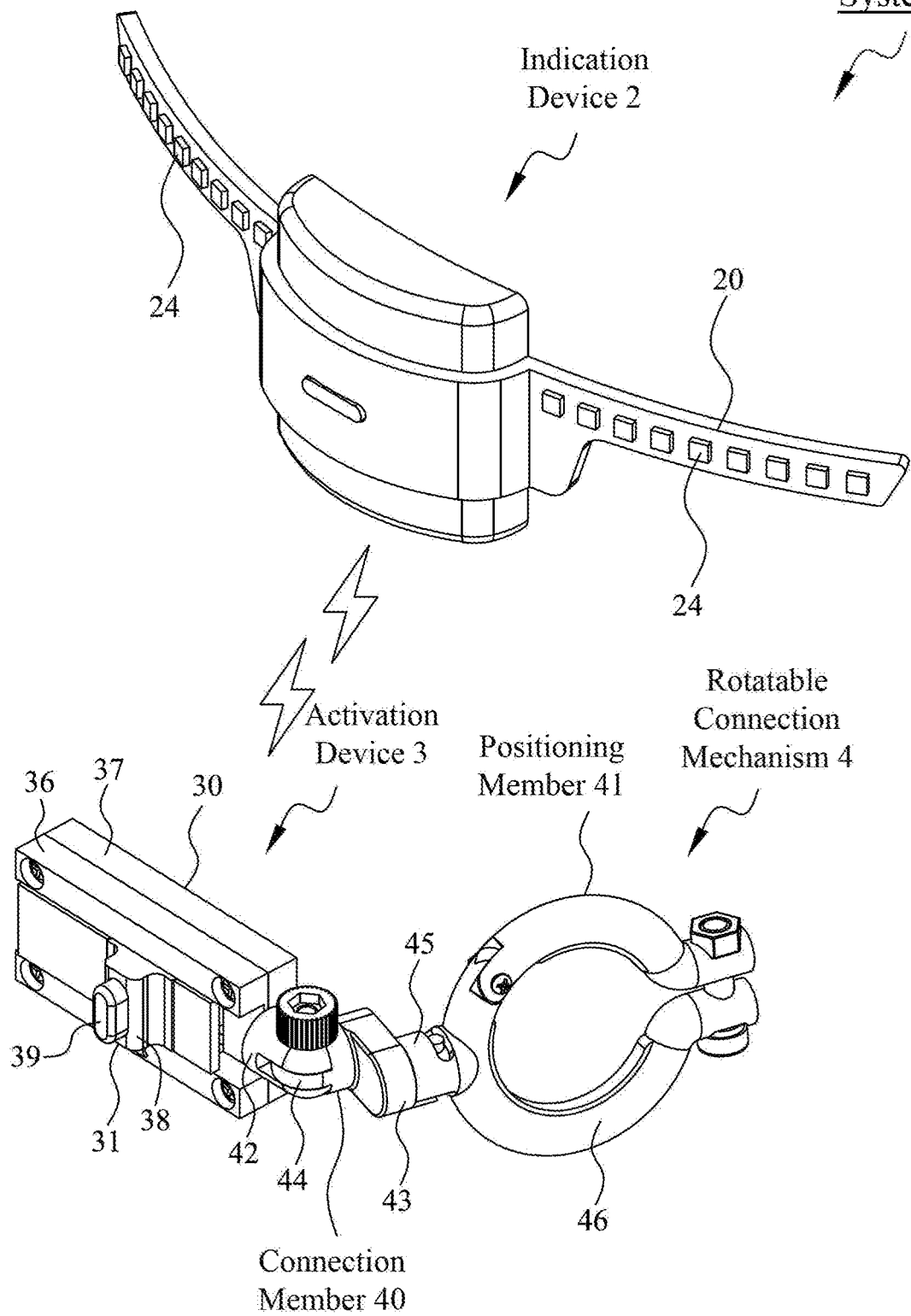
FIG. 1 is a perspective view of an indication system according to a first preferred embodiment of the present invention.
Figure 2:
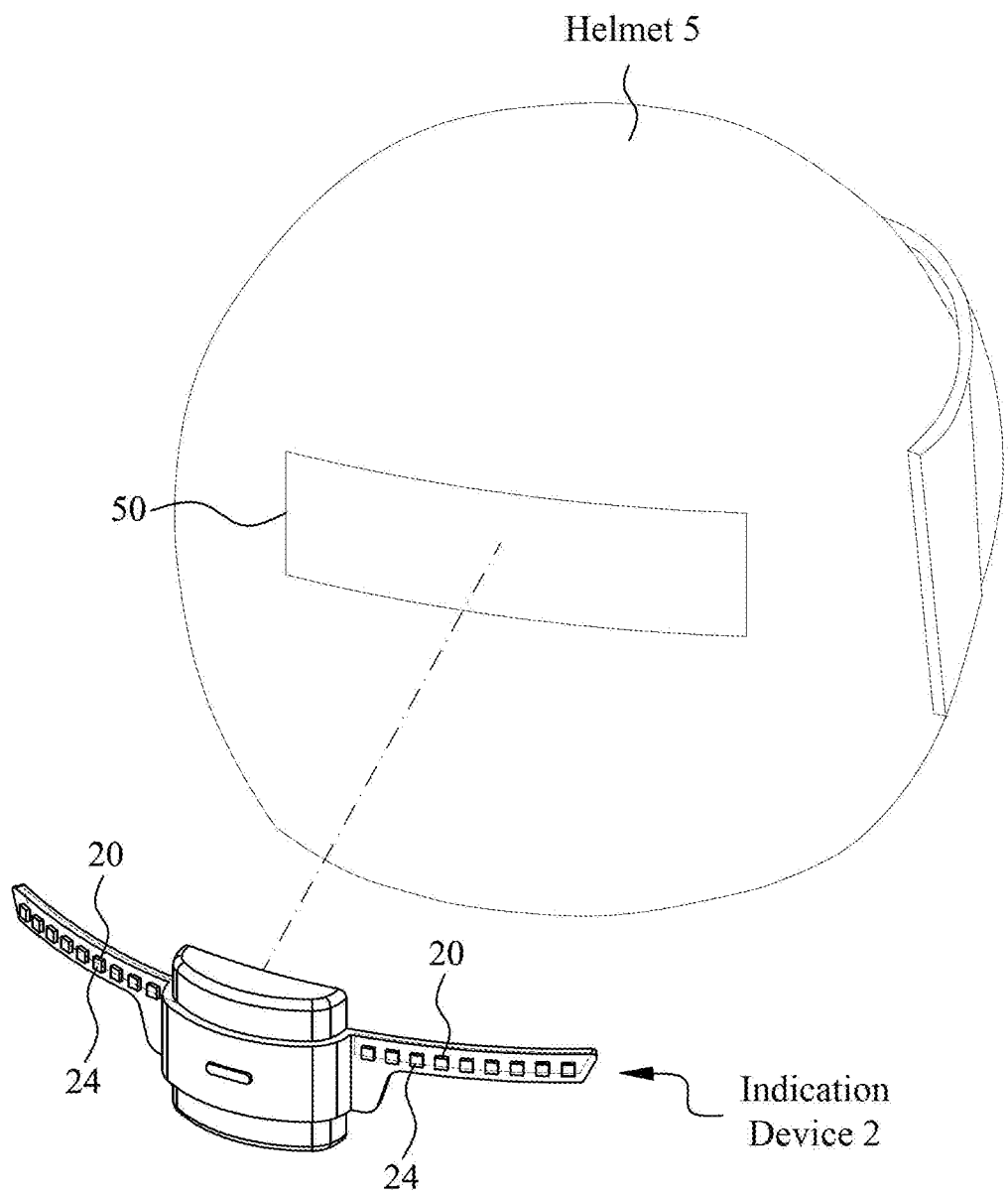
FIG. 2 is a schematic view of mounting an indication device on a helmet according to present invention.
Figure 3:
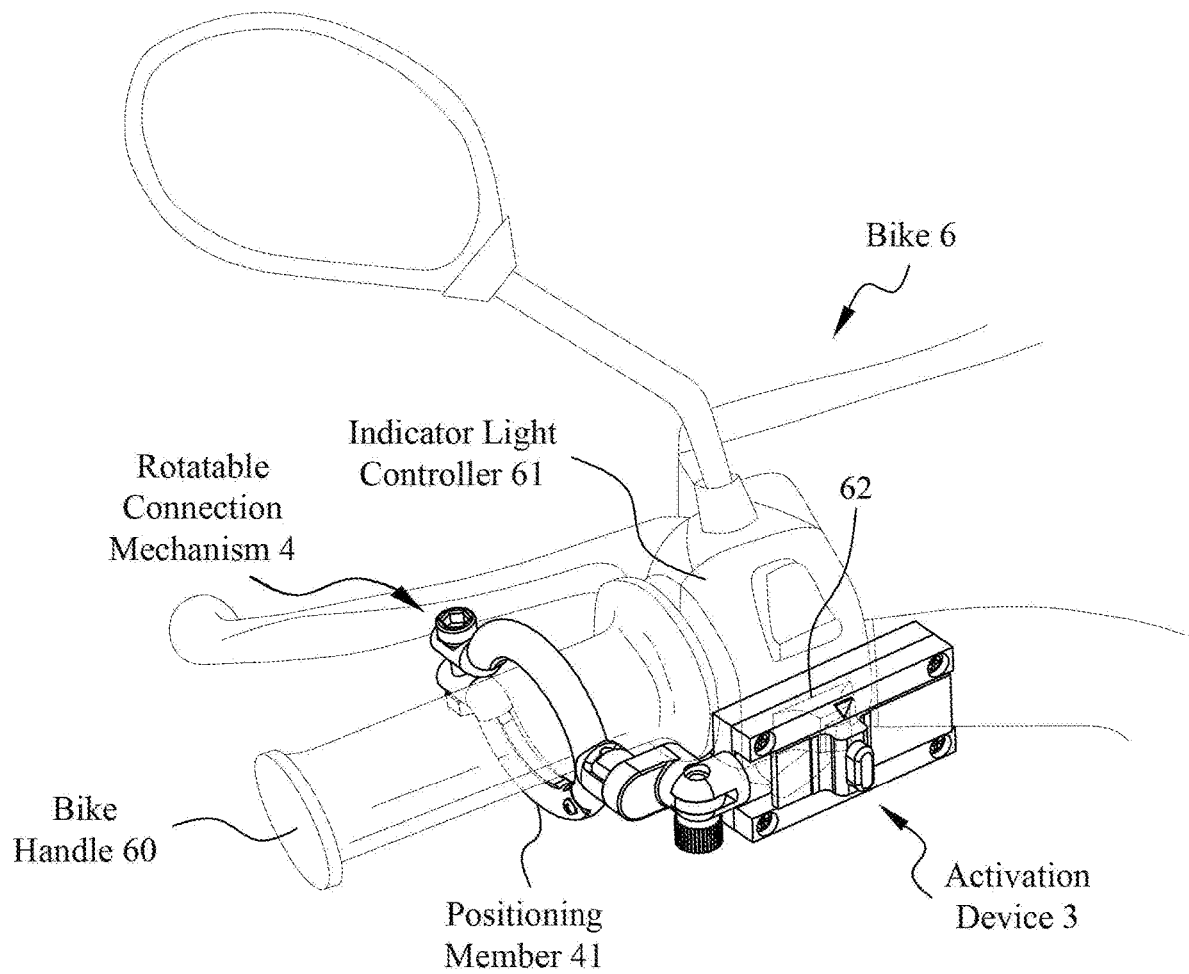
FIG. 3 is a schematic view of mounting an activation device on a biker handle through a rotatable connection mechanism according to present invention.

Reference is made to FIG. 1 to FIG. 3, an indication system 1 of the present invention includes an indication device 2, an activation device 3 and a rotatable connection mechanism 4. As shown in FIG. 2, the indication device 2 may be mounted on a helmet 5 to use. In one possible embodiment, the indication device 2 can be fixed onto the helmet 5 via a fixed adhesive component 50, a detachable hook and loop fastener (not shown), or a detachable positioning component (not shown), wherein the positioning component has a first member connected to the helmet 5 and a second member connected to the indication device 2, and is positioned by engaging the first member with the second member.

However, this is merely convenient for illustration and is not limit thereto, the indication device 2 can also be mounted to raincoat, jacket, backpack or any other clothes and located on the back of the user according to the requirements. As shown in FIG. 3, the rotatable connection mechanism 4 is mounted on a bike handle 60 of a bike 6 and is adjacent to an indicator light controller 61, and the activation device 3 is assembly connected to the indicator light controller 61 through the rotatable connection mechanism 4.

Figure 4:
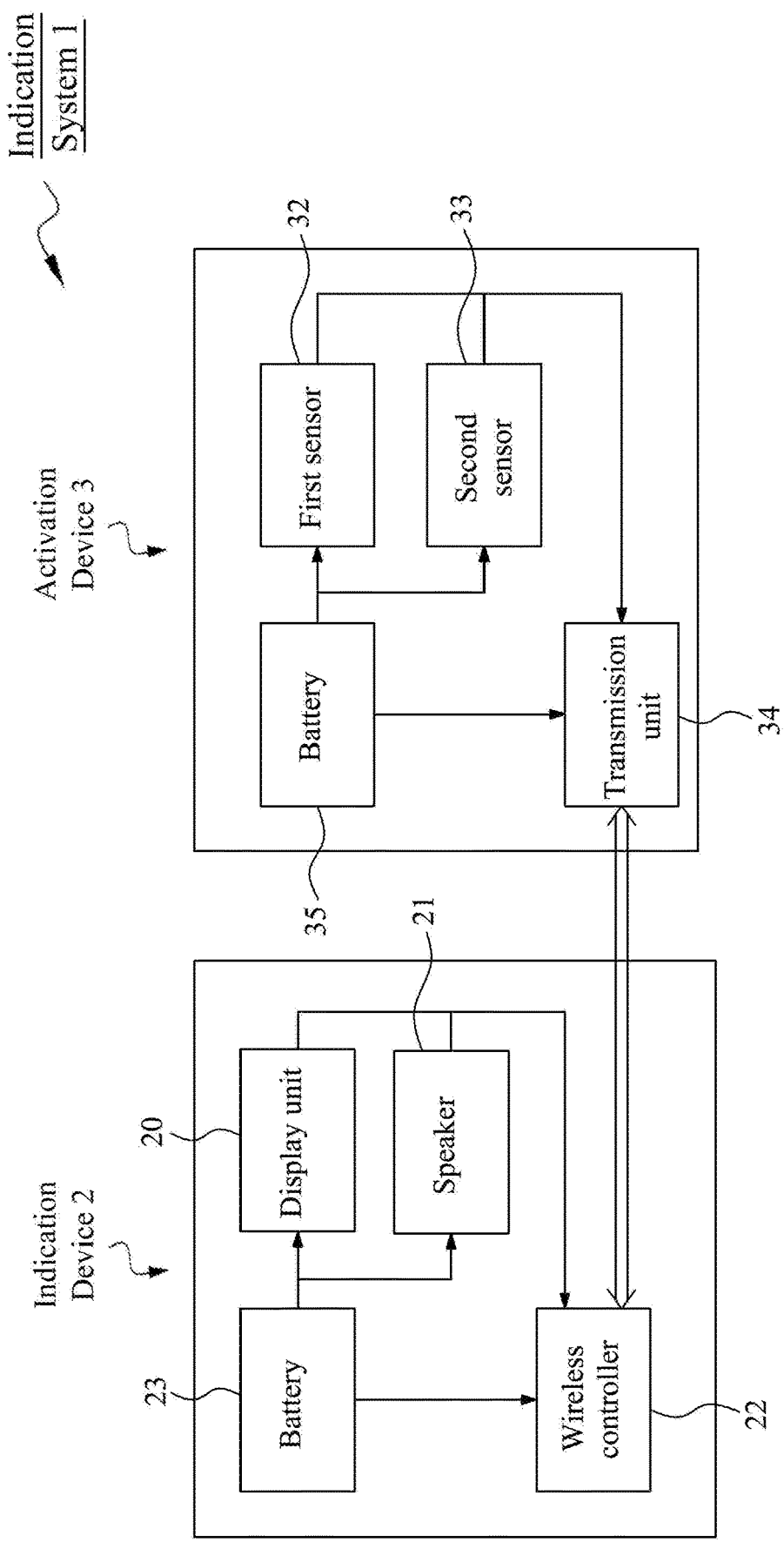
FIG. 4 is a block view of an indication system according to present invention.

Reference is made to FIG. 2 and FIG. 4. The indication device 2 is provided with at least one display unit 20 and a speaker 21, and is provided internally with a wireless controller 22 and a battery 23. The wireless controller 22 is electrically connected to the at least one display unit 20, and controls the display state of the at least one display unit 20 and the contents that the speaker 21 plays by receiving the control instructions. The battery 23 supplies power to the at least one display unit 20, the wireless controller 22, and the speaker 21.

Figure 5A:
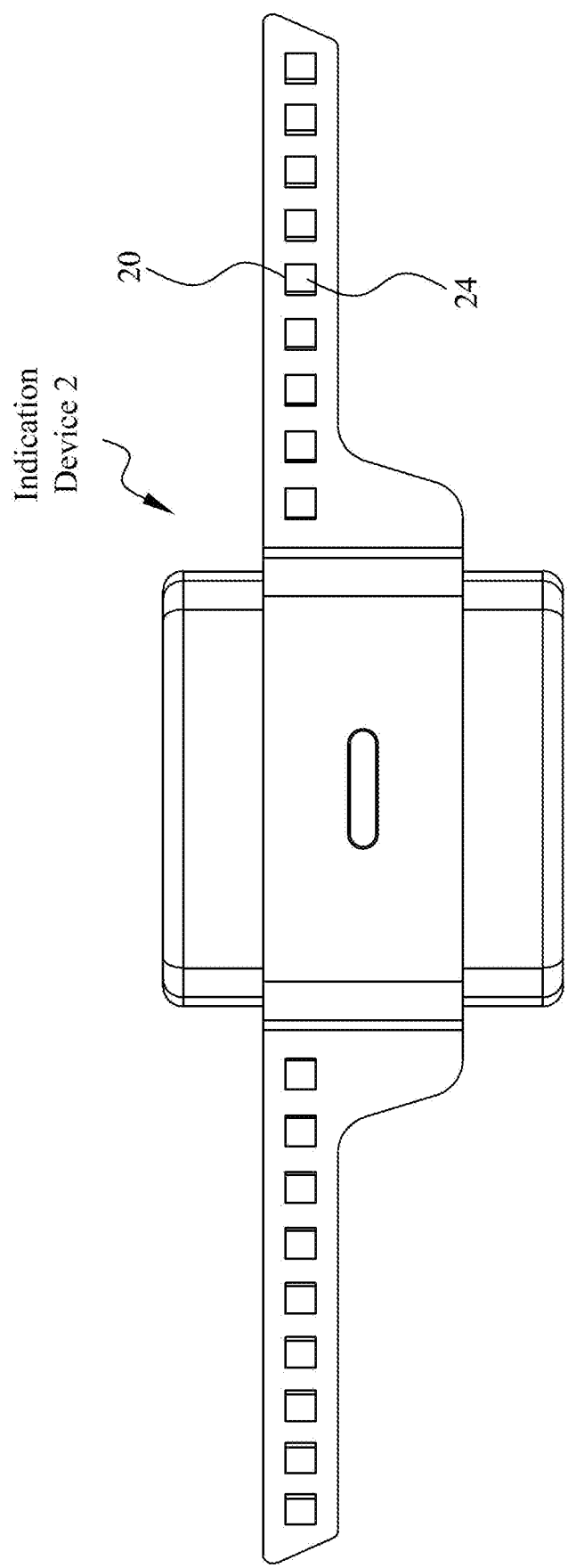
FIG. 5A to FIG. 5E are schematic views of indication devices according to various embodiments of the present invention.

In one possible embodiment, reference is made to FIG. 5A, the at least one display unit 20 is provided with a plurality of LED lights 24, and the LED lights 24 are arranged on two sides of the indication device 2 and each side of them is presented in the form of straight line, wherein the LED lights 24 can emit different colors of light, thereby indicating the direction or being used as warning. The LED lights 24 can emit lights simultaneously or in order.

Figure 5B:
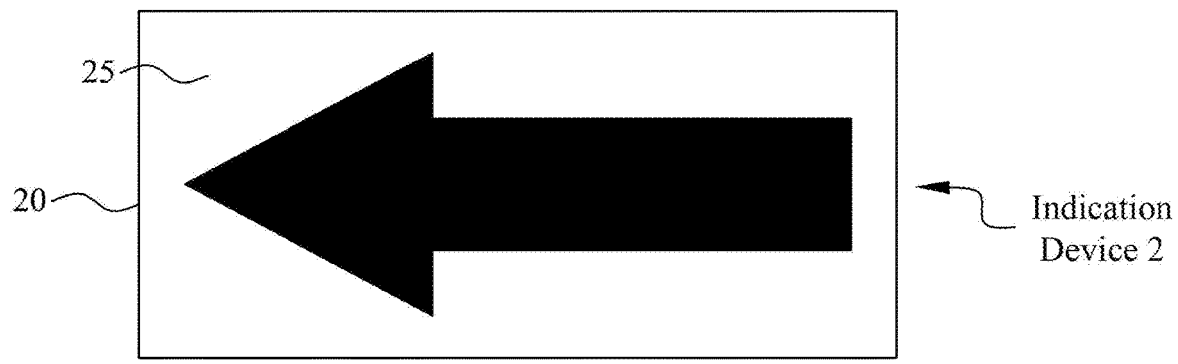
Figure 5C:
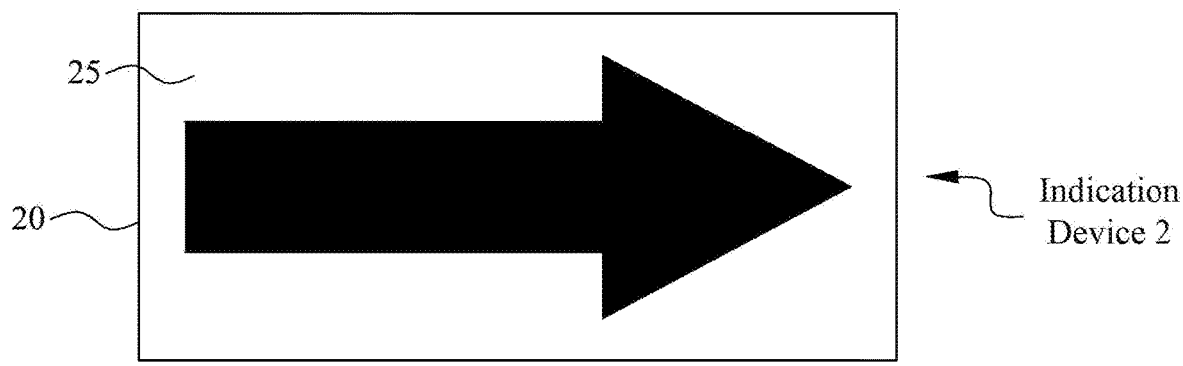
Figure 5D:

In another possible embodiment, the at least one display unit 20 is provided with a display screen 25, and the display screen 25 is capable of generating different of indication patterns. Reference is made to FIG. 5B to FIG. 5D, the indication patterns includes direction icons (FIG. 5B and FIG. 5C), dynamic image, character (FIG. 5D), color, etc.

Figure 5E:
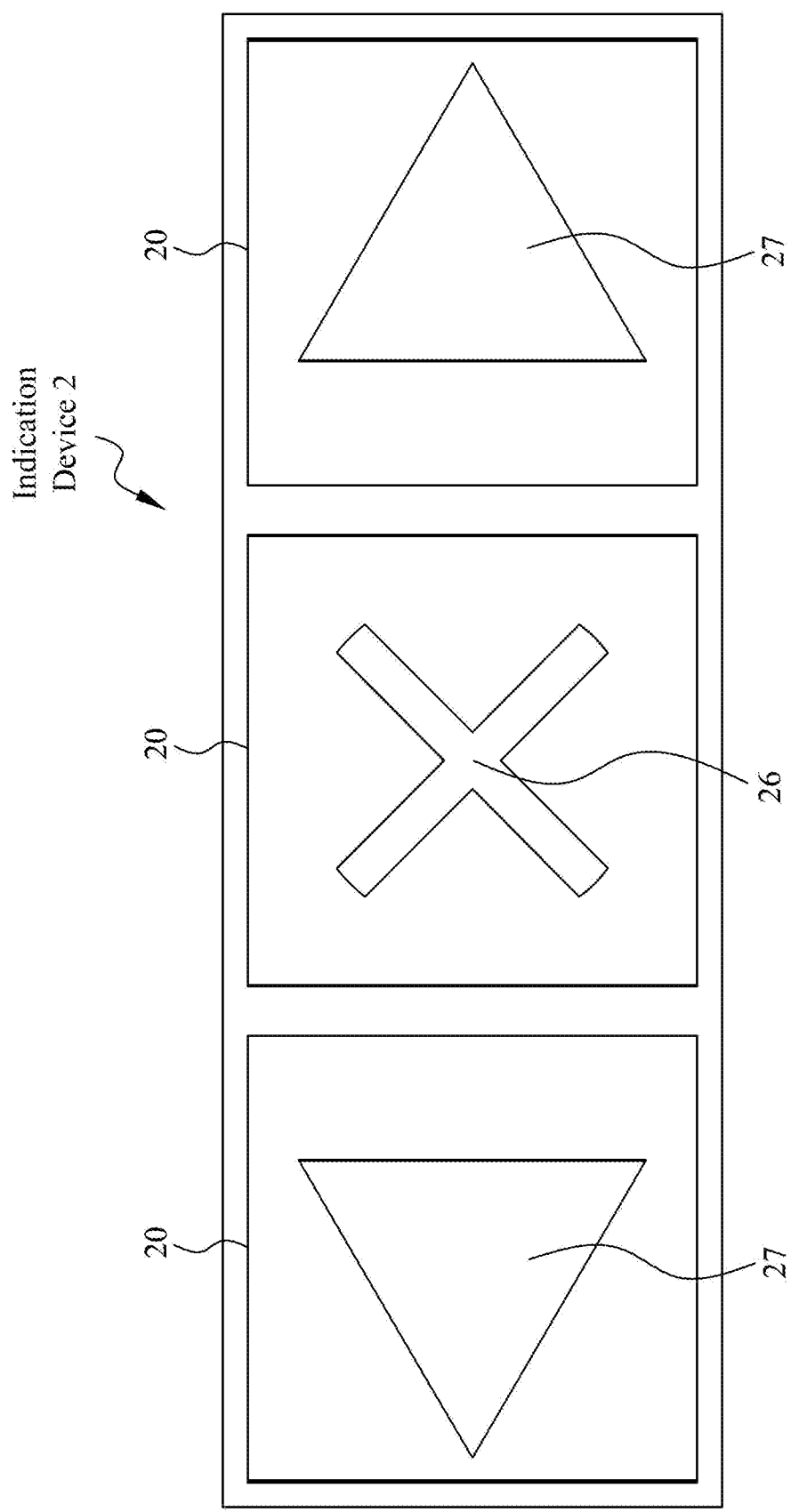

In one further possible embodiment, reference is made to FIG. 5E, the at least one display unit 20 is provided with a warning light 26 and two turn lights 27. The warning light 26 emits light continuously when the indication device 2 is activated, and one of two turn lights 27 emits light correspondingly once they are controlled by the wireless controller 22.

Figure 6:
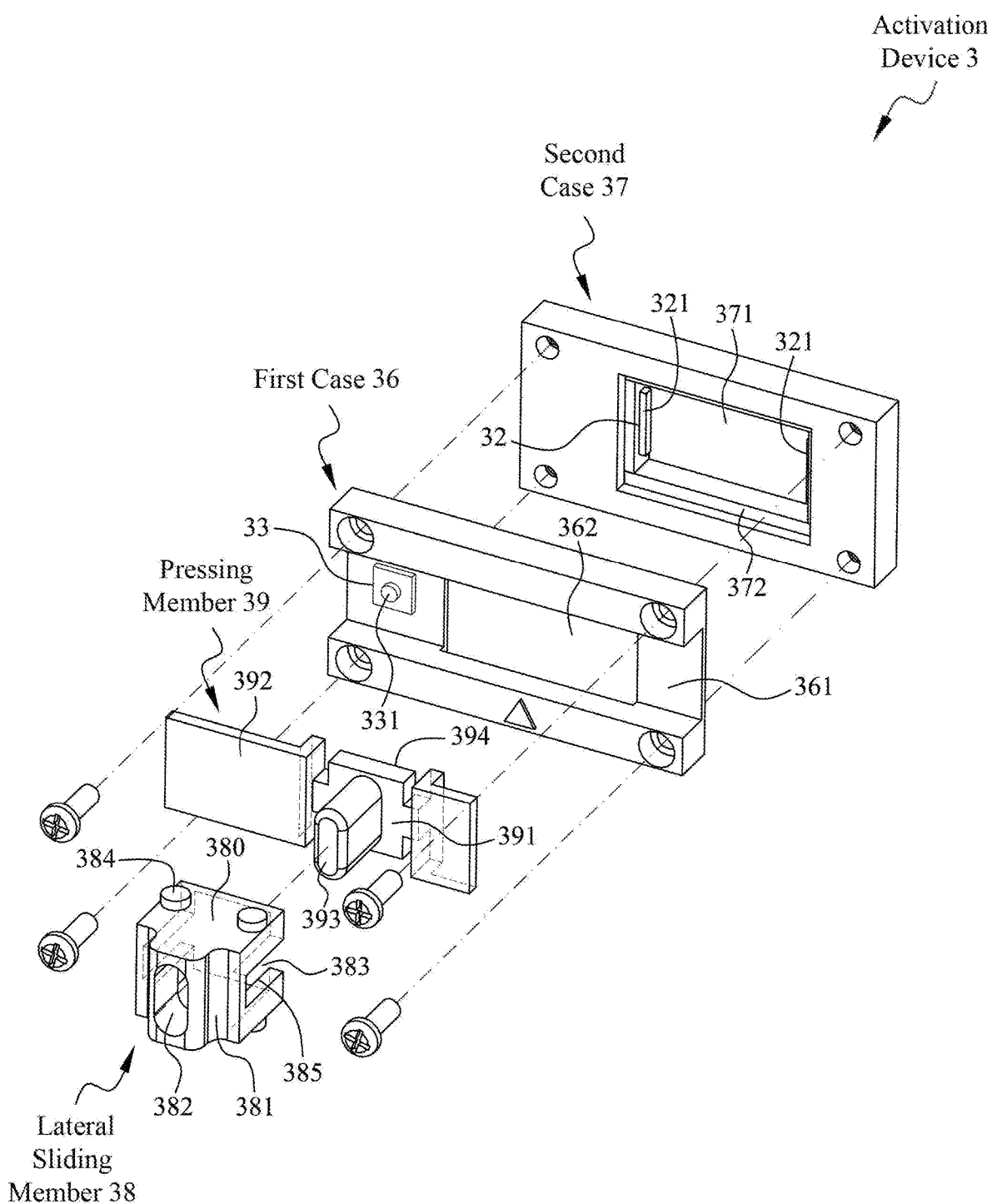
FIG. 6 is an exploded view of an activation device according to present invention.
Figure 7:
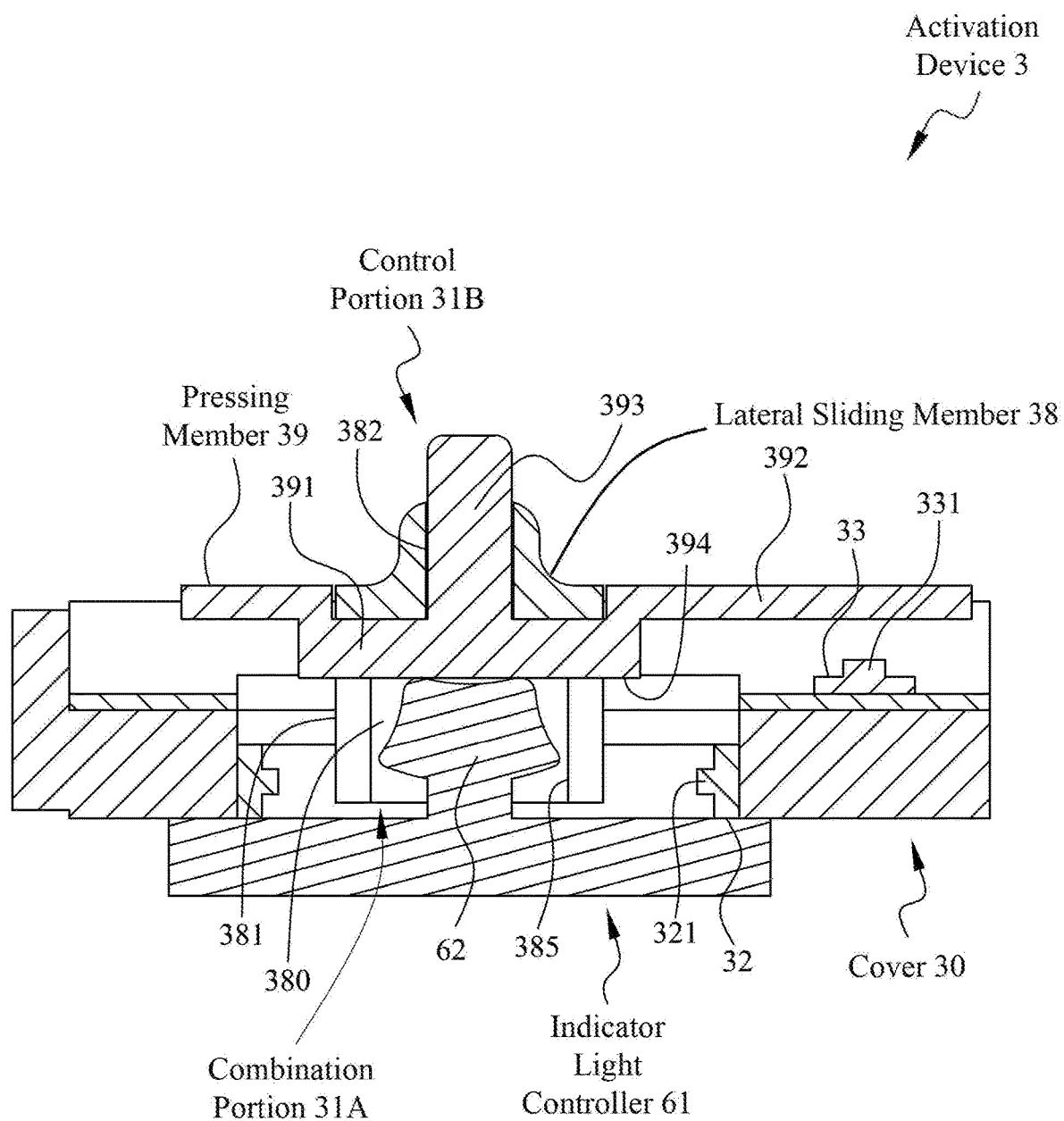
FIG. 7 is a sectional view of an activation device combined with a biker controller according to the present invention.

Reference is made to FIG. 4, FIG. 6 and FIG. 7. The activation device 3 includes a cover 30 and an activator 31 movably mounted to the cover 30. As shown in FIG. 4, the cover 30 is provided with a first sensor 32, a second sensor 33, a transmission unit 34, and a battery 35. The first sensor 32 can sense a horizontal displacement of the activator 31 to generate a first signal, and the second sensor 33 can sense a vertical displacement of the activator 31 to generate a second signal. The transmission unit 34 is electrically connected to the first sensor 32 and second sensor 33, and configured for transmitting the first signal and the second signal to the wireless controller 22.

In one possible embodiment, as shown in FIG. 6 and FIG. 7. The cover 30 is provided with a first case 36 and a second case 37 assembly connected to the first case 36, and the first case 36 and the second case 37 are relatively located on an upper position and a lower position respectively. The first case 36 is formed with a first groove 361 and a first opening 362 which is located below the first groove 361, the second case 37 is formed with a second opening 371 corresponding to the position of the first opening 362, and at least one slide rail 372 is formed above the second opening 371. Wherein the first sensor 32 includes a plurality of lateral tact switches 321 which are located on the opposite sides of the second openings 371 separately, and the second sensor 33 includes a longitudinal tact switch 331 which is located in the first groove 361.

In addition, the activator 31 is constructed with a combination portion 31A and a control portion 31B on the opposite sides separately, wherein the combination portion 31A is located inside the second opening 371 and the control portion 31B projects through the first opening 362. The combination portion 31A can cooperate with and be assembly connected to an operation member 62 of the indicator light controller 61, such that the combination portion 31A can drive the operation member 62 to be displaced synchronously when the control portion 31B is driven by a user to move horizontally or vertically.

As shown in the figure, the activator 31 includes a lateral sliding member 38 and a pressing member 39. The lateral sliding member 38 is movably mounted to the slide rail 372 to move horizontally, and the pressing member 39 is movably mounted to the lateral sliding member 38 to move vertically.

Wherein the lateral sliding member 38 is provided with a casing body 381 which forms a combination space 380, such that the lateral tact switches 321 are located on the opposite sides outside of the casing body 381, respectively. A top portion and a side surface of the casing body 381 are provided with a perforation 382 and a slot 383 separately, and a wall surface of the casing body 381 adjacent to the slot 383 is provided with at least one guiding block 384. The pressing member 39 is provided with a substrate 391 located within the combination space 380. One side of the substrate 391 is provided with a pressing plate 392 which projects and extends outwardly through the slot 383, such that the pressing plate 392 is located above and covers the longitudinal tact switch 331. A top portion of the substrate 391 is provided with a protruding block 393 extending upwardly through the perforation 382, so that the user can press the protruding block 393 to produce a vertical motion. The combination portion 31A drives the operation member 62 to be displaced by a bottom surface 394 of the substrate 391 and an inner side wall surface 385 of the casing body 381.

Figure 8A:
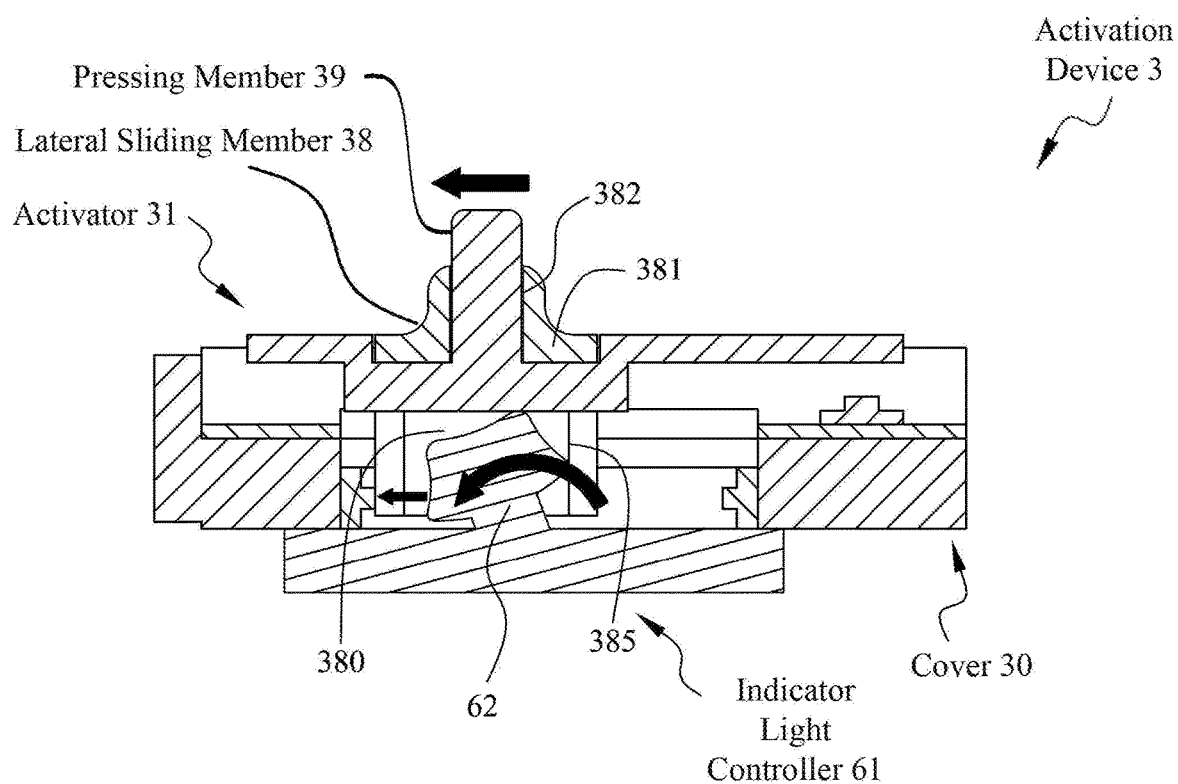
FIG. 8A to FIG. 8B are schematic views of the activation device moving horizontally and vertically according to the present invention.

Reference is made to FIG. 8A. When the user triggers the activator 31 to move toward the left side horizontally, the lateral sliding member 38 and the pressing member 39 move left simultaneously, and the inner wall surface 385 of the casing body 381 will drive the operation member 62 of the indicator light controller 61 to swing left until the casing body 381 of the lateral sliding member 38 contacts one of the lateral tact switches 321 of the first sensor 32.

At this time, the activation device 3 will generate a first control signal to the transmission unit 34 and the transmission unit 34 will transmit the first control signal to the wireless controller 22 of the indication device 2, such that the display unit 20 of the indication device 2 can be driven by the wireless controller 22 to emit light for alerting others.

Figure 8B:
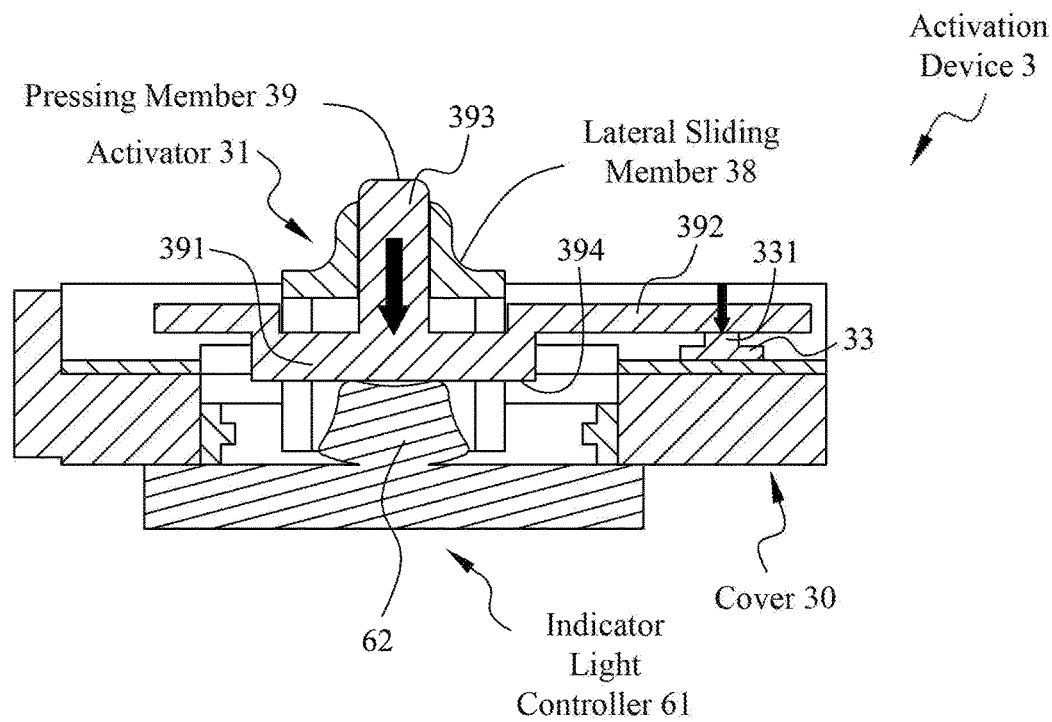

Reference is made to FIG. 8B. When the user presses the activator 31 to move vertically, the pressing member 39 generates the vertical displacement alone and the lateral sliding member 38 does not move. As shown in the figure, when the protruding block 393 of the pressing member 39 is pressed, the substrate 391 of the pressing member 39 will move down cooperatively and press against the operation member 62 down simultaneously. The pressing plate 392 of the pressing member 39 will move down with the substrate 391 synchronously until the substrate 391 contacts the longitudinal tact switch 331 of the second sensor 33.

At this time, the activation device 3 will generate a second control signal to the transmission unit 34 and the transmission unit 34 will transmit the second control signal to the wireless controller 22 of the indication device 2, such that the display unit 20 of the indication device 2 can be controlled by the wireless controller 22 to be turned off.

Figure 9:
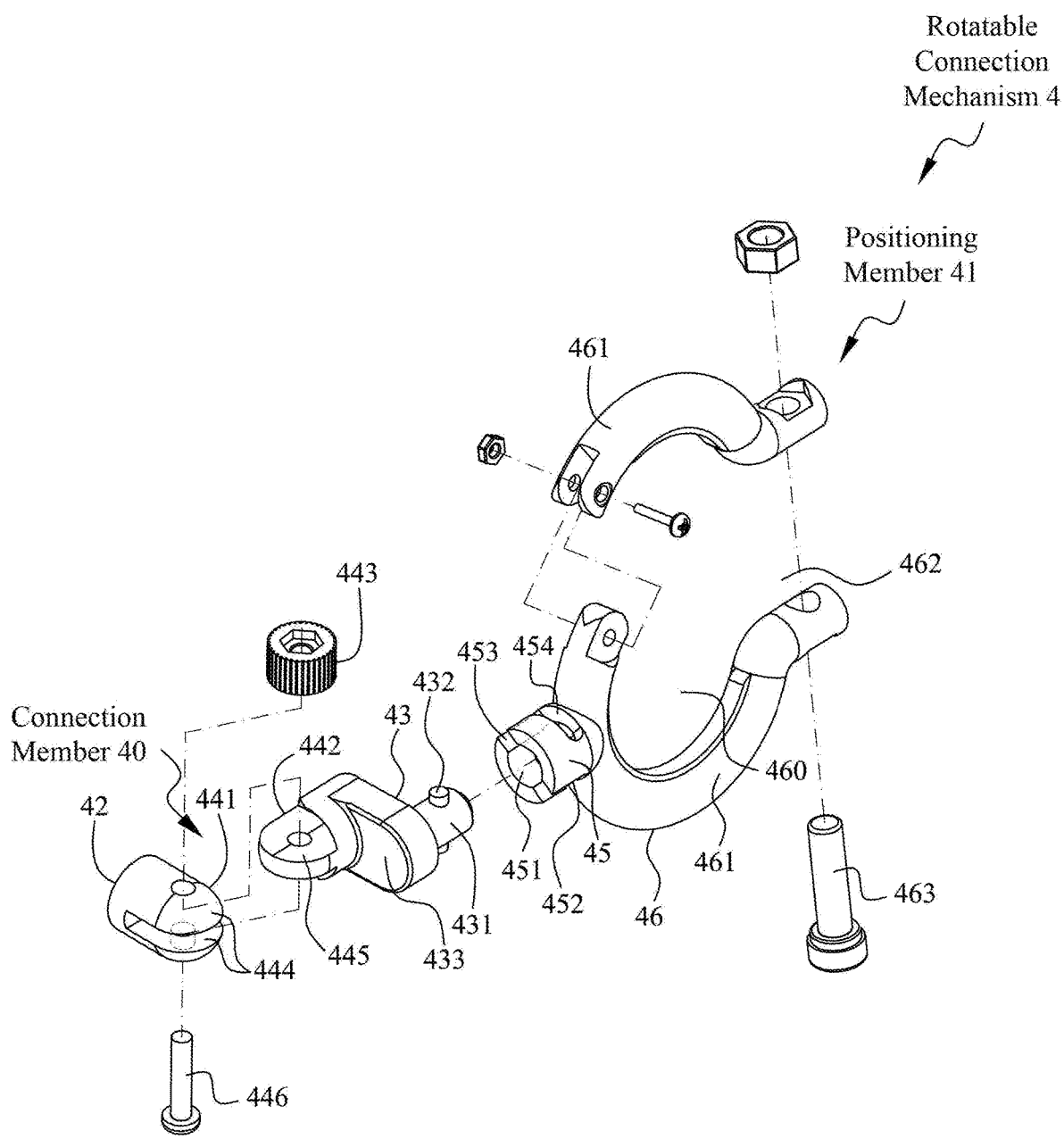
FIG. 9 is an exploded view of a rotatable connection mechanism according to the present invention.

Reference is made to FIG. 9. The rotatable connection mechanism 4 includes a connection member 40 and a positioning member 41. One end of the connection member 40 is constructed with a connection portion 42 fixed to the cover 30, and another opposite end of the connection member 40 is constructed with a first assembling portion 43 which is assembly connected to the positioning member 41. A turning portion 44 is constructed between the connection portion 42 and the first assembling portion 43. Wherein the turning portion 44 has a first pivot joint 441, a second pivot joint 442 and a compressing unit 443. The first pivot joint 441 is adjacent to the connection portion 42, and is provided with two first head portions 444 which are spaced apart. The second pivot joint 442 is connected to the positioning member 41, can swing relatively with the first pivot joint 441, and is provided with a second head portion 445 located between two first head portions 444. The compressing unit 443 is configured to switch the first pivot joint 441 and the second pivot joint 442 in an active state or a fixed state selectively, wherein the active state is that the first pivot joint 441 is swingable relatively with the second pivot joint 442, and the fixed state is that the first pivot joint 441 is unable to move relatively to the second pivot joint 442. In one possible embodiment, the compressing unit 443 is provided with a pivot connecting rod 446 which is pivotally disposed between the first heads 444 and the second head 445.

The positioning member 41 is provided with a second assembling portion 45 which is detachably connected to the first assembling portion 43, and the second assembling portion 45 is connected to a positioning portion 46 which forms a positioning space 460. In a preferred embodiment, the positioning portion 46 is provided with two gripping arms 461 to form a positioning space 460 collectively, and the size of the positioning space 460 can be changed when the gripping arms 461 are displaced or deformed. As shown in the figure, there is a gap 462, which is communicated with the positioning space 460, being formed between the gripping arms, and a latch member 463 is disposed through the gripping arms 461 in the position of the gap 462, such that the gripping arms 461 are deformed by a force to change the size of the positioning space 460.

In a preferred embodiment in the figure, the first assembling portion 43 is provided with a stub 431, and two opposite sides of the stub 431 are provided with a guiding rod 432. The second assembling portion 45 is provided with a recess 451 capable of accommodating the stub 431. Two opposite sides of the recess 451 are provided with a guiding rail 452 disposed on the wall surfaces of the recess 451, and the guiding rail 452 has a first path 453 and a second path 454 turned from the first path 453. As shown in the figure, it presents that the second path 454 is perpendicular to the first path 453.

Figure 10A:
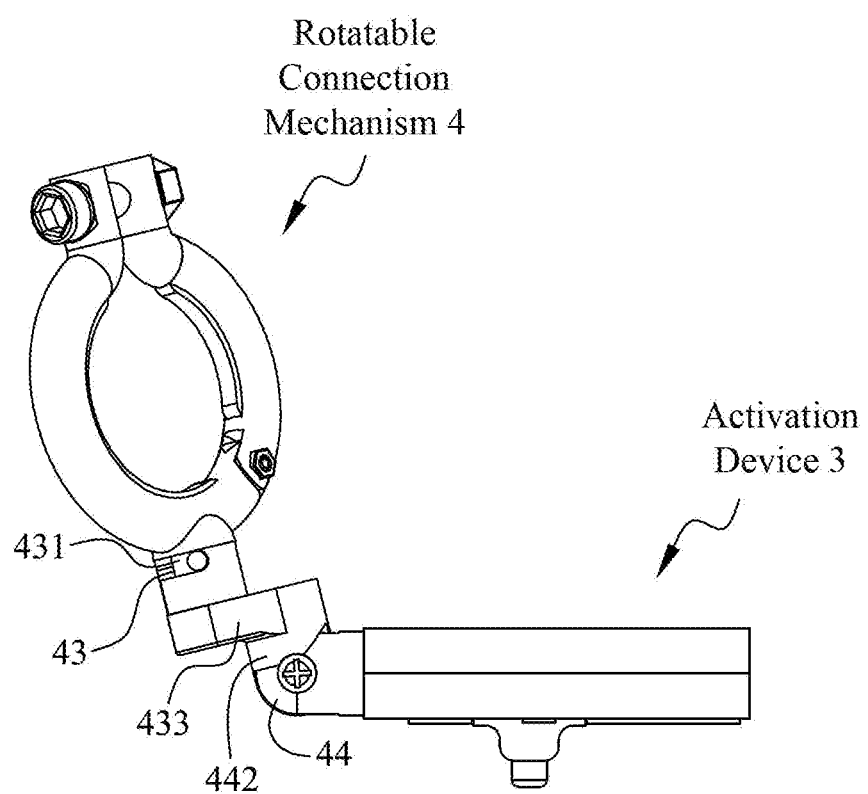
FIG. 10A to FIG. 10C are schematic views of rotatable connection mechanism according to various embodiments of the present invention.
Figure 10B:
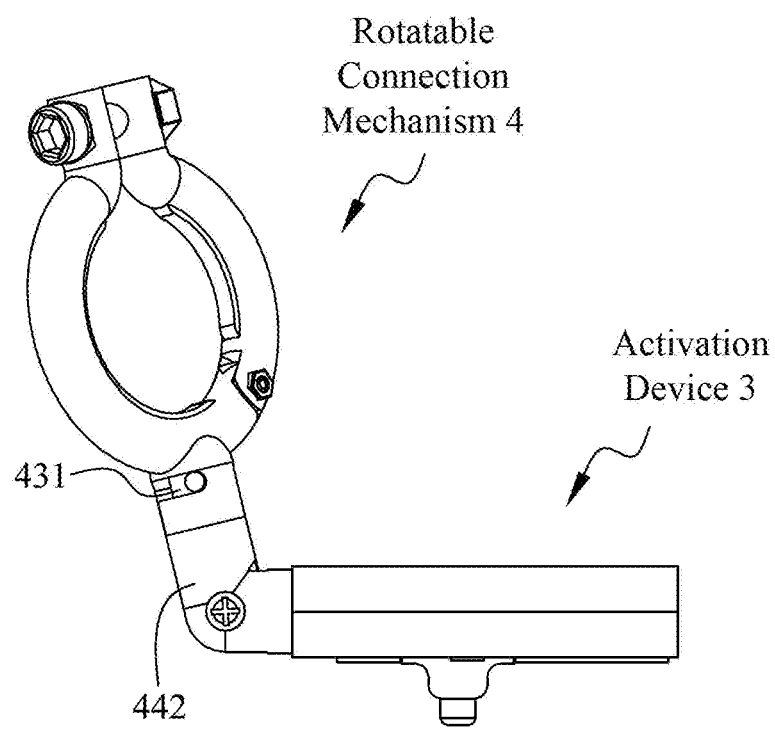
Figure 10C:
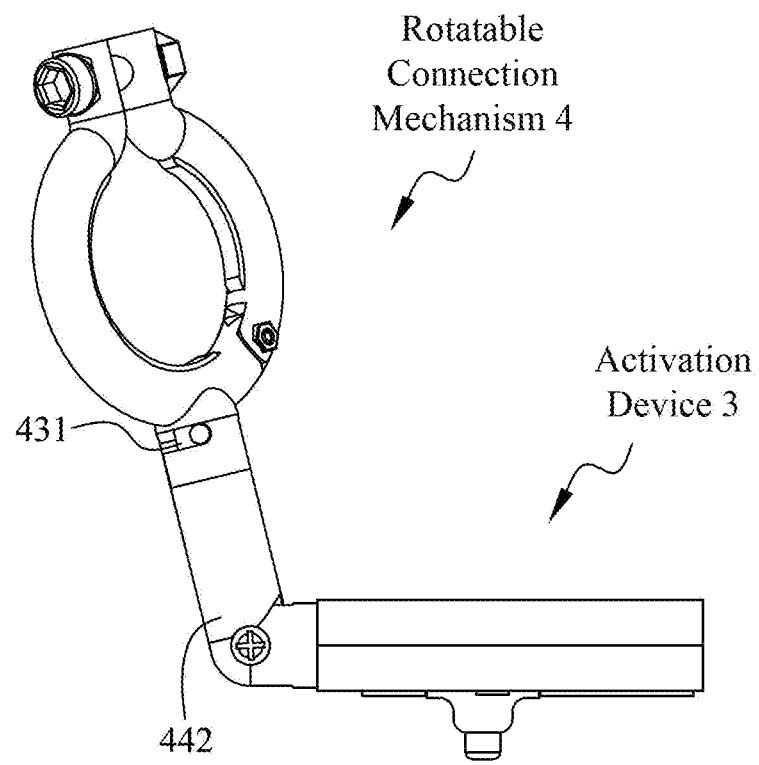

Furthermore, the bikes with different brands have different sizes and structures of the indicator light controllers 61. Therefore, in a first possible embodiment, reference is made to FIG. 10A, the stub 431 of the first assembling portion 43 and the second pivot joint 442 of the turning portion 44 are respectively connected to two opposite ends of a plate body 433, so that both are located at different axial positions. In a second possible embodiment, reference is made to FIG. 10B, the stub 431 and the second pivot joint 442 are located at the same axial position, and a first distance is formed therebetween. In a third possible embodiment, reference is made to FIG. 10C, the stub 431 and the second pivot joint 442 are also located at the same axial position, but a second length formed therebetween is greater than the first distance.

Figure 11A:
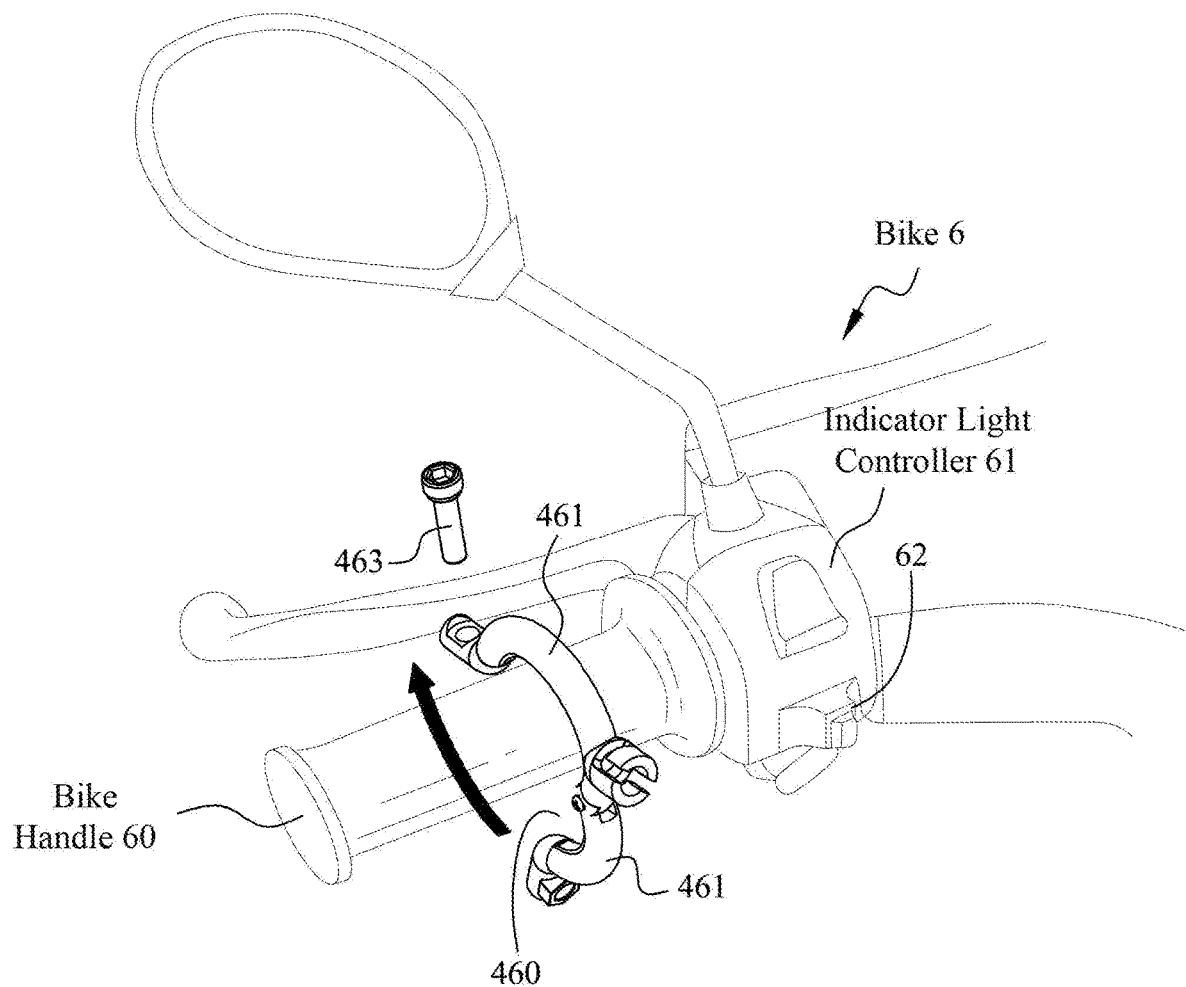
FIG. 11A to FIG. 11D are sequence diagrams of the installation of the rotatable connection mechanism according to the present invention.
Figure 11B:
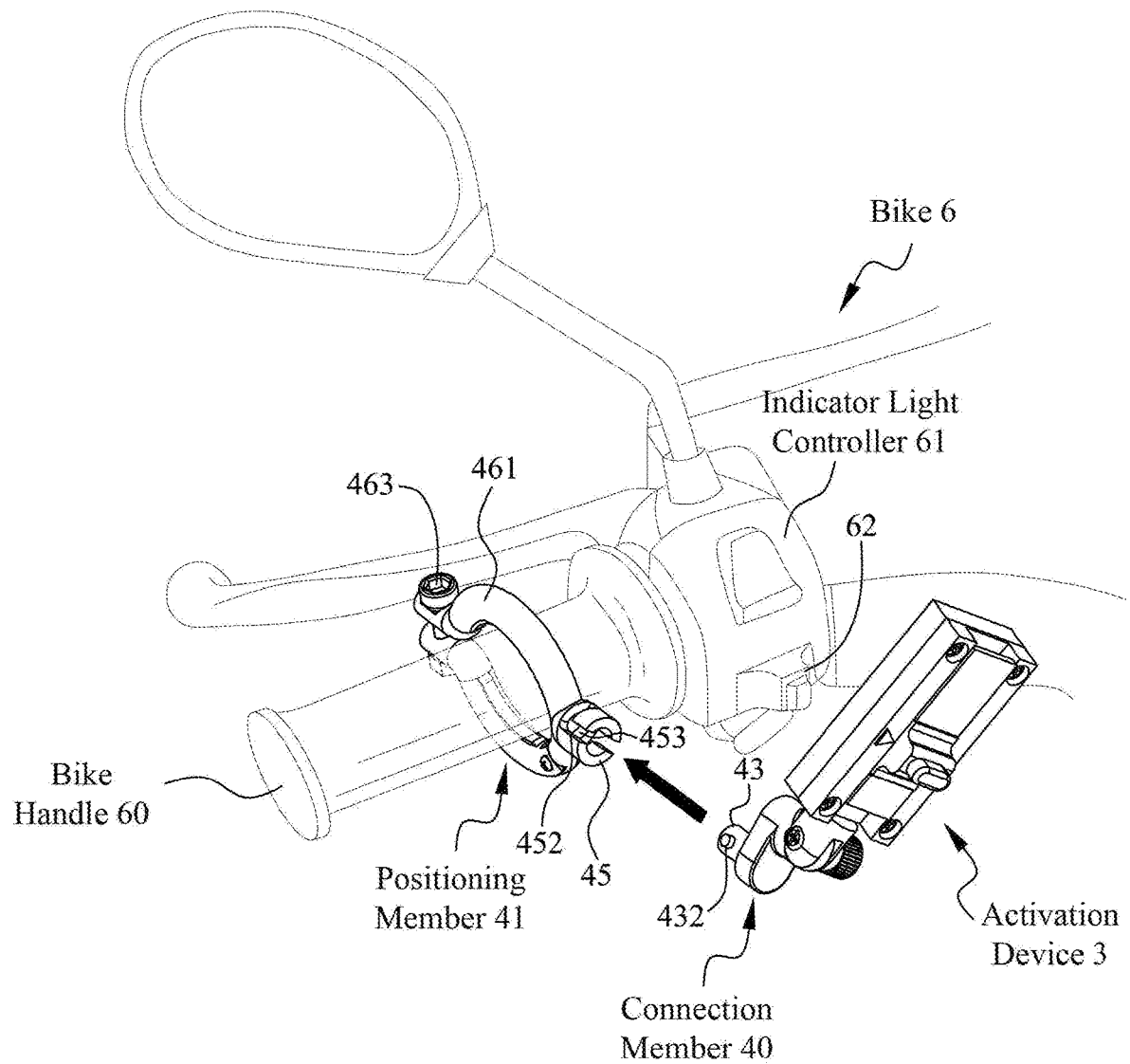

Reference is made to FIG. 11A to FIG. 11B. When a user wants to install the indication system 1 of the present invention on the bike, first, the latch member 463 is released such that two gripping arms 461 are separated to expand the positioning space 460. Then, the positioning space 460 of the positioning member 41 is moved along the direction of the bike handle 60, such that the gripping arms 461 are provided on the outer periphery of the bike handle 60. Afterwards, the latch member 463 is used to lock the gripping arms 461 such that the positioning space 460 is reduced and the gripping arms 461 are compressed against and fixed to two sides of the bike handle 60. In addition, the connection member 40 connected to the activation device 3 is moved toward the positioning member 41, and two guiding rods 432 of the connection member 40 are aligned with two guiding rails 452 of the positioning member 41. Next, the first assembling portion 43 is put into the second assembling portion 45, such that the guiding rods 432 move into the first path 453 of the guiding rail 452 straightly.

Figure 11C:
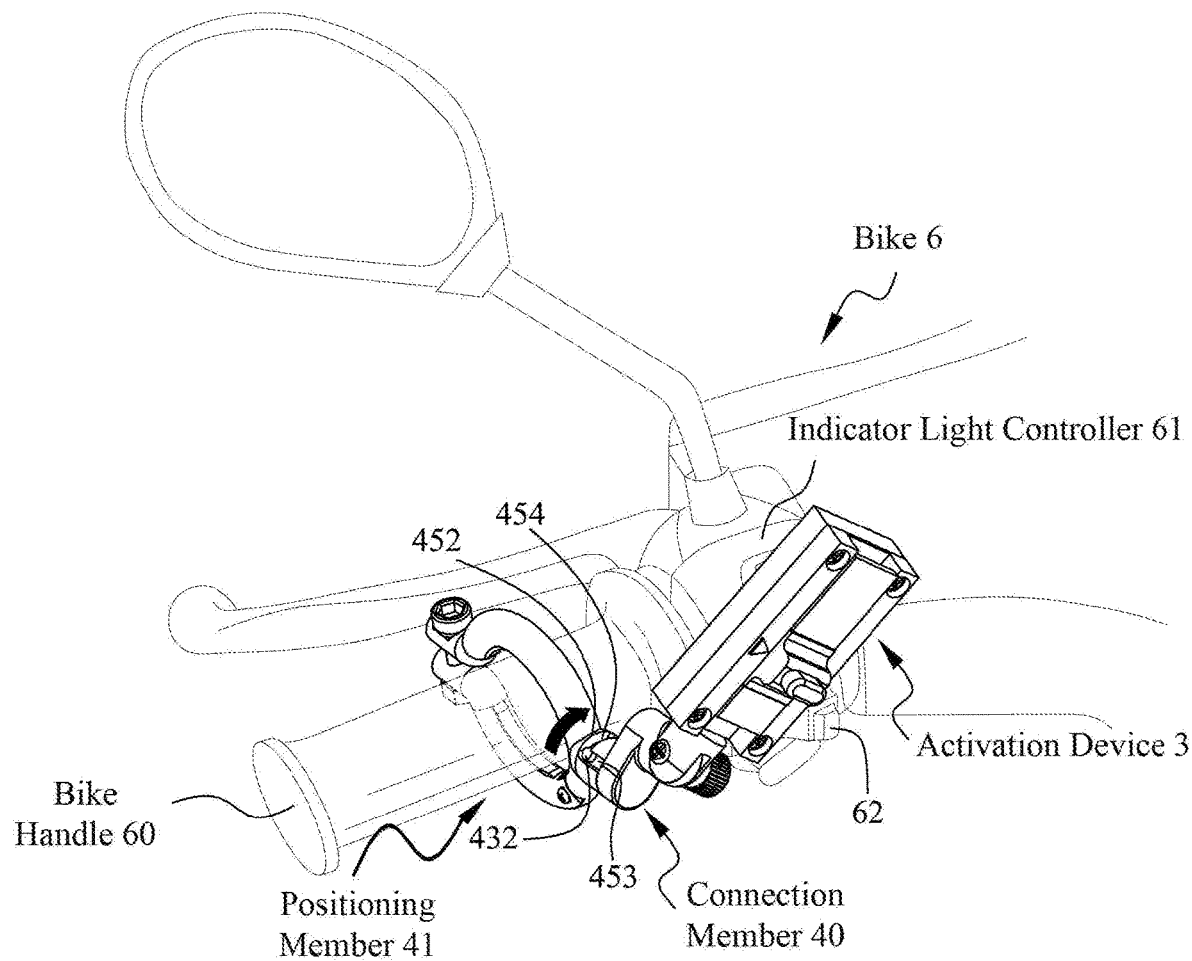

Reference is made to FIG. 11C. The connection member 40 is rotated such that the guiding rods 432 move from the first path 453 of the guiding rails 452 into the second path 454 rotationally, thereby making the first assembling portion 43 be engaged with the second assembling portion 45 correspondingly and being positioned. At this time, the activation device 3 will rotate synchronously until it is aligned with the operation member 62 of the indicator light controller 61.

Figure 11D:
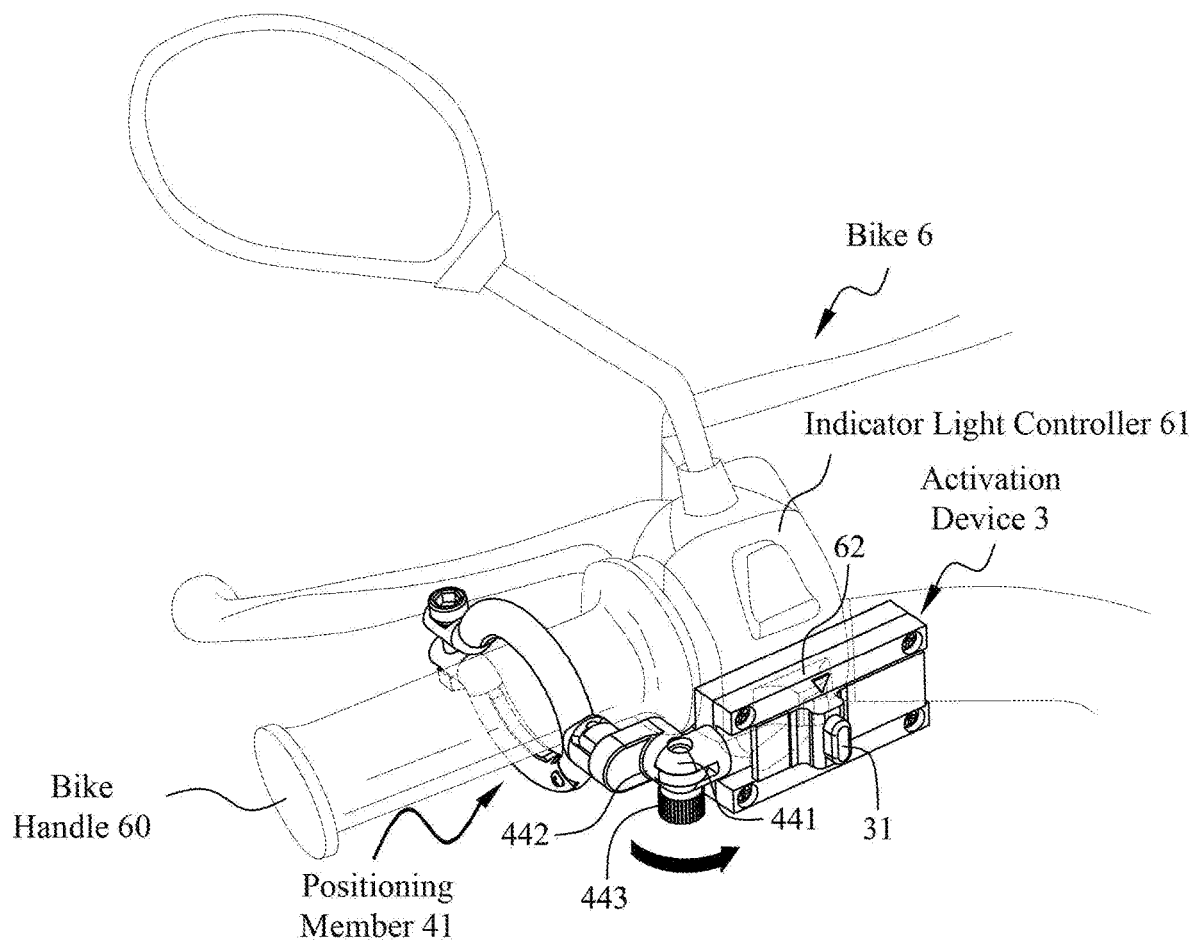

Reference is made to FIG. 11D, the compressing unit 443 is released for that the first pivot joint 441 is able to swing relatively twith the second pivot joint 442 to change the relative position between the activation device 3 and the operation member 62, and then the first pivot joint 441 is rotated until the operation member 62 enters the second opening 371 of the activation device 3. Finally, the compressing unit 443 is locked up, such that the first pivot joint 441 is unable to swing relatively to the second pivot joint 442. At this time, the activator 31 of the activation device 3 and the operation member 62 form a cooperative mechanism capable of moving synchronously.

Through the aforementioned installing method, the present invention allows the indication system 1 to cooperate with the indicator light controller 61 of the bike 6 synchronously. As a result, it allows the user to manipulate the activation device 3 once, and the indicator light of the bike 6 and the display unit 20 of the indication system 1 can be turned on or turned off simultaneously, thereby greatly increasing the convenience of usage.

Figure 12:
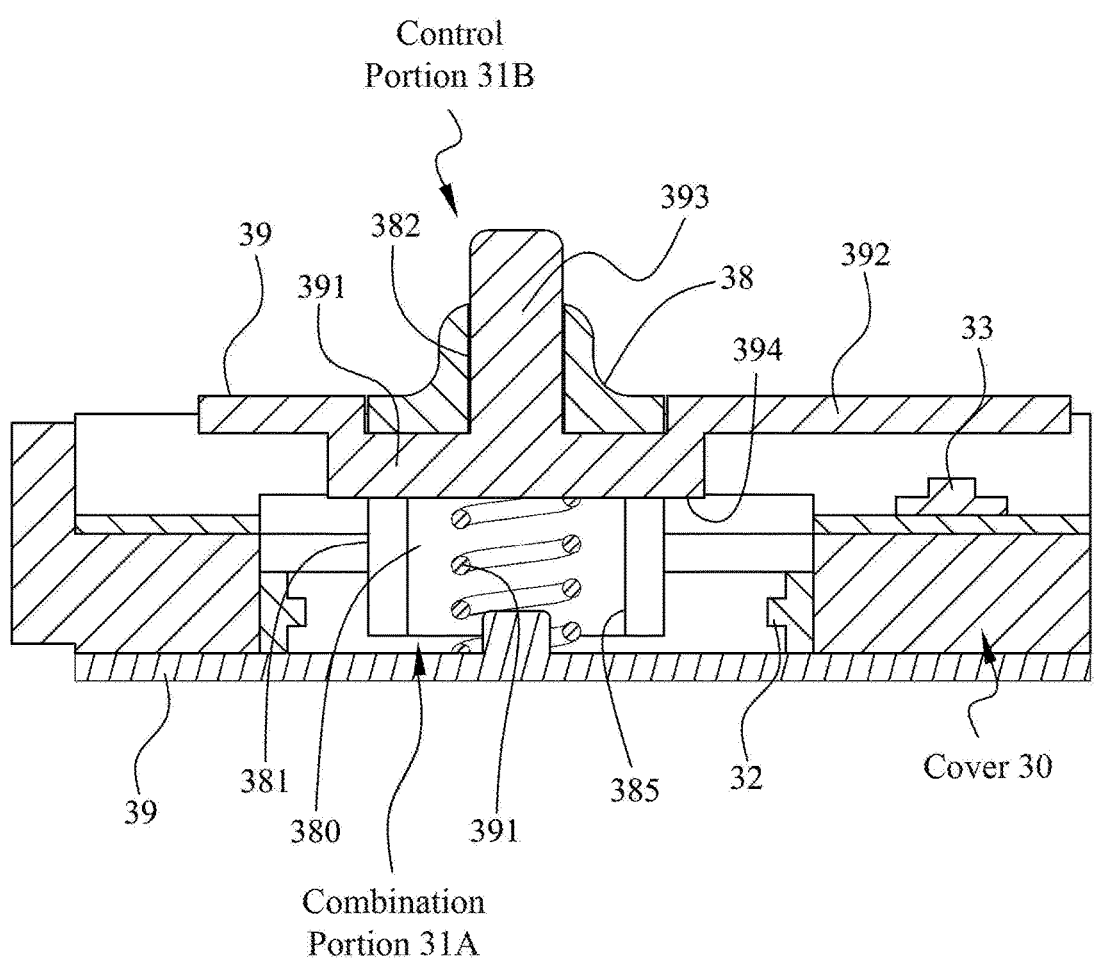
FIG. 12 is a sectional view of an independently-used activation device assembly connected to a covering body according to the present invention.

Reference is made to FIG. 12. The indication device 3 of the indication system 1 of the present invention is further provided with a covering body 39. The covering body 39 can be fastened to the second opening 371 of the cover 30, such that the second opening 371 is closed. The covering body 39 is provided with a resilient member 391 located in the second opening 371, so that the resilient member 391 can contact against the combination portion 31A of the activator 31. Accordingly, the indication system 1 of the present invention can also be mounted to other transportations other than the bike 6 without a controller (e.g., bicycle). Alternatively, the rotatable connection mechanism 4 is disassembled, and the activation device 3 is held by the user and used in conjunction with the indication device 2, and thus the user is able to use the indication system 1 of the present invention while walking, thereby greatly increasing the usage range of the product.

Figure 13:
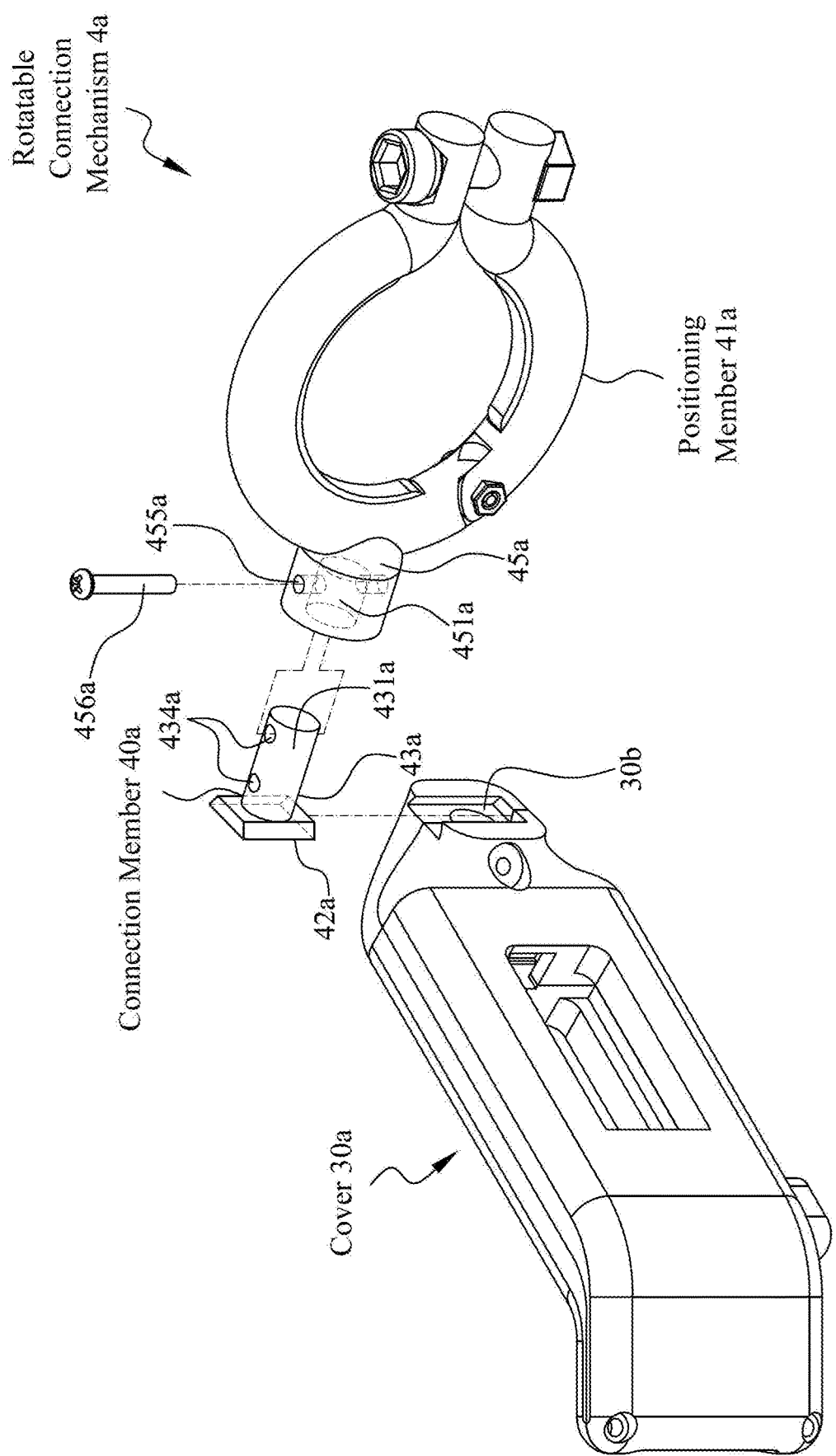
FIG. 13 is an exploded view of an indication system according to a second preferred embodiment of the present invention.
Figure 14:
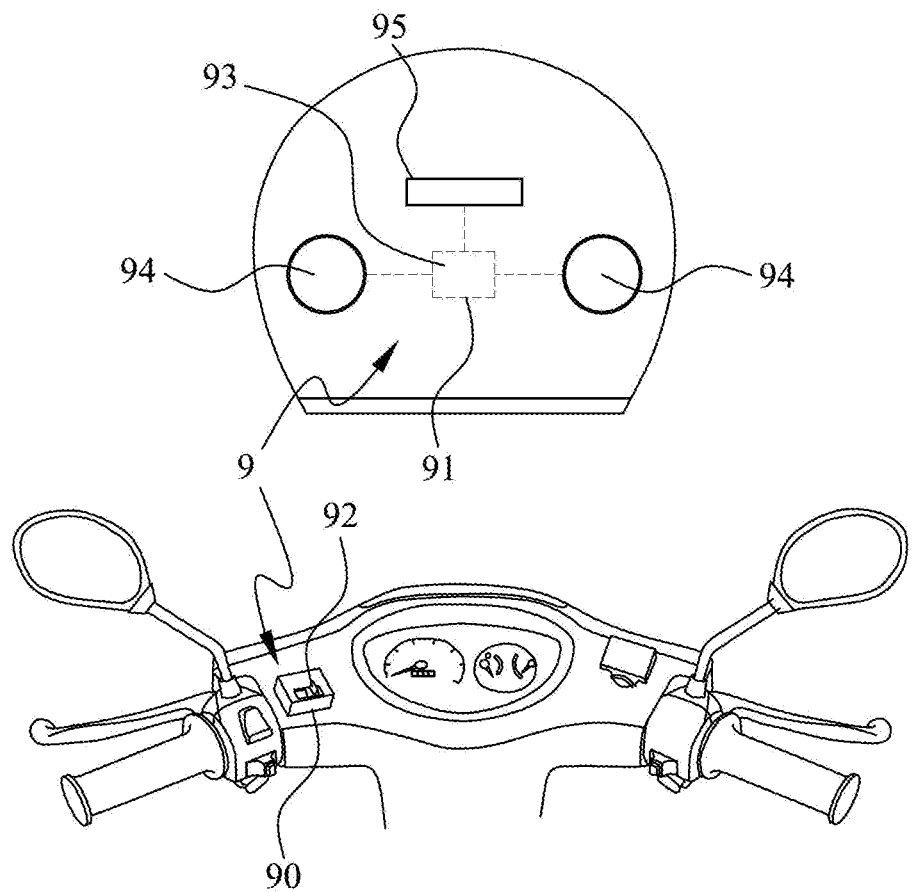
FIG. 14 is a schematic view of a conventional signal light control device.

Reference is made to FIG. 13. A second preferred embodiment is illustrated, in which the difference from the first preferred embodiment is that the structure of the rotatable connection mechanism 4a is different. Wherein the rotatable connection mechanism 4a also includes a connection member 40a and a positioning member 41a, and the connection member 40a is also constructed with a connection portion 42a and a first assembling portion 43a on two opposite tends. However, there is no turning portion 44 as designed in the first preferred embodiment between the first connection portion 42a and the first assembling portion 43a, and a dovetail groove 30b is employed and disposed on the cover 30a for fixing the connection portion 42a to the cover 30a, wherein the connection portion 42a is designed to be a shape corresponding to the dovetail groove 30b.

Moreover, the first assembling portion 43a is also provided with a stub 431a, but the stub 431a is changed to having at least one positioning hole 434a thereon. The second assembling portion 45a is only provided a recess 451a for accommodating the stub 431a and a perforation 455a for communicating with the recess 451a, and does not have the guiding rails 452 in the first preferred embodiment. The position of the positioning hole 434a on the first assembling portion 43a and the position of the perforation 455a on the second assembling portion 45a are selected according to the different bike brands. Next, a latch member 456a passes through the positioning hole 434a and the perforation 455a to fix it.

What is claimed is:

1. An indication system, comprising:
   an indication device comprising at least one display unit and a wireless controller for controlling the at least one display unit;
   an activation device comprising a cover and an activator movably mounted to the cover;
   wherein the cover is provided with a first sensor, a second sensor and a transmission unit, wherein the first sensor senses a horizontal displacement of the activator to generate a first signal, the second sensor senses a vertical displacement of the activator to generate a second signal, and the transmission unit is electrically connected to the first and second sensors and is configured for transmitting the first signal and the second signal to the wireless controller;
   wherein the activator is constructed with a combination portion and a control portion separately on the opposite sides of the activator, the combination portion is assembly connected to and cooperates with an operation member of an indicator light of a bike, such that the combination portion drives the operation member to be displaced synchronously when the control portion is driven by a user to move horizontally or vertically.

2. The indication system according to claim 1, wherein the activator comprises a lateral sliding member and a pressing member, the lateral sliding member is movably mounted to a slide rail inside the cover to move horizontally, and the pressing member is movably mounted to the lateral sliding member to move vertically.

3. The indication system according to claim 2, wherein the lateral sliding member is provided with a casing body which forms a combination space, and a top portion and a side surface of the casing body are provided with a perforation and a slot, respectively; the pressing member is provided with a substrate located within the combination space, one side of the substrate is provided with a pressing plate projecting and extending outwardly through the slot, the top portion of the substrate is provided with a protruding block extending upwardly through the perforation, and the combination portion drives the operation member to be displaced by a bottom surface of the substrate and an inner side wall surface of the casing body.

4. The indication system according to claim 3, wherein the first sensor comprises a plurality of lateral tact switches disposed to two opposite sides outside of the casing body, respectively; and the second sensor comprises a longitudinal tact switch disposed below and covered by the pressing plate.

5. The indication system according to claim 1, wherein the cover comprises a first case and a second case assembly connected to the first case, the first case is formed with a first opening for the control portion of the activator to project therethrough and to be exposed, the second case is formed with a second opening, and the position of the second opening is corresponding to the position of the combination portion.

6. The indication system according to claim 5, wherein the activation device further comprises a covering body disposed on and fastened to the second opening, and the covering body comprises a resilient member contacting against the combination portion of the activator.

7. The indication system according to claim 1, wherein the indication system further comprises a rotatable connection mechanism, and the rotatable connection mechanism comprises:
   a connection member, one end of the connection member being constructed with a connection portion fixed to the cover, and another opposite end of the connection member being constructed with a first assembling portion; and
   a positioning member is provided with a second assembling portion detachably connected to the first assembling portion, and the second assembling portion being connected to a positioning portion with a positioning space.

8. The indication system according to claim 7, wherein the connection member further comprises a turning portion located between the connection portion and the first assembling portion, and the turning portion comprises a first pivot joint and a second pivot joint for swinging relatively with the first pivot joint.

9. The indication system according to claim 8, wherein the connection member is further provided with an compressing unit configured for acting on the first pivot joint and the second pivot joint, so as to switch the first pivot joint and the second pivot joint in an active state or a fixed state selectively, wherein the active state is that the first pivot joint is swung relatively with the second pivot joint, and the fixed state is that the first pivot joint is unable to move relatively to the second pivot joint.

10. The indication system according to claim 7, wherein the positioning portion is provided with two gripping arms to form a positioning space collectively, and when the gripping arms are displaced or deformed, the size of the positioning space is changed.

11. The indication system according to claim 10, wherein a gap communicated with the positioning space is formed between the gripping arms, and a latch member is disposed through the gripping arms in the position of gap, such that the gripping arms are deformed by a force to change the size of the positioning space.

12. The indication system according to claim 7, wherein the first assembling portion is provided with a stub, two opposite sides of the stub are provided with a guiding rod respectively, a second assembling portion is provided with a recess for accommodating the stub, the recess is provided with a plurality of guiding rails disposed on two opposite wall surfaces of the recess, and the guiding rail comprises a first path and a second path turned from the first path.

\* \* \* \* \*